(12) United States Patent
Levine et al.

(10) Patent No.: US 9,445,421 B2
(45) Date of Patent: Sep. 13, 2016

(54) SYSTEM AND METHOD FOR MANAGING FREQUENCY LAYER PRIORITY ASSIGNMENTS WITHIN MOBILE WIRELESS NETWORK RADIO INTERFACES

(71) Applicant: United States Cellular Corporation, Chicago, IL (US)

(72) Inventors: Jonathan Michael Levine, Chicago, IL (US); Jeffrey William Baenke, Arlington Heights, IL (US); Narothum Saxena, Hoffman Estates, IL (US); Michael Shannon Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 21 days.

(21) Appl. No.: 14/305,788

(22) Filed: Jun. 16, 2014

(65) Prior Publication Data

US 2015/0365954 A1 Dec. 17, 2015

(51) Int. Cl.
*H04W 72/06* (2009.01)
*H04W 88/18* (2009.01)
*H04W 24/08* (2009.01)

(52) U.S. Cl.
CPC ............. *H04W 72/06* (2013.01); *H04W 88/18* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2004/0203717 A1* | 10/2004 | Wingrowicz | ......... | H04W 24/00 455/423 |
| 2007/0070937 A1* | 3/2007 | Demirhan | ............. | H04W 72/06 370/328 |
| 2010/0142448 A1* | 6/2010 | Schlicht | .................. | H04W 4/20 370/328 |
| 2010/0273422 A1* | 10/2010 | Garrett | .................. | H04W 52/52 455/41.2 |
| 2011/0306343 A1* | 12/2011 | Buford | ................ | H04M 1/2535 455/435.1 |
| 2012/0140649 A1* | 6/2012 | Choudhury | ........... | H04W 24/10 370/252 |
| 2014/0036667 A1* | 2/2014 | Balasubramanian | | H04W 28/0231 370/230 |
| 2014/0243005 A1* | 8/2014 | Yanover | ................ | H04W 28/16 455/452.1 |
| 2015/0120833 A1* | 4/2015 | De Foy | ............... | H04L 67/1097 709/204 |

* cited by examiner

*Primary Examiner* — Lester Kincaid
*Assistant Examiner* — Daniel G Bassett
(74) *Attorney, Agent, or Firm* — Leydig, Voit & Mayer, Ltd.

(57) ABSTRACT

A method and system are described for managing radio frequency layer priority settings for radio access network nodes in a mobile wireless network. A programmed server is configured with an initial configuration of the trigger definitions and corresponding radio frequency layer priority settings. Thereafter, the programmed server applies current conditions bearing upon a conditional area to a conditional area trigger definition. The programmed server then issues, based upon the application of the current conditions to the conditional area trigger definition, a message to re-designate radio frequency layer priority settings for a cell. The programmed server thereafter receives network characteristics feedback.

17 Claims, 5 Drawing Sheets

| Conditional Area Preference ⟋300 | Conditional Area ⟋310 | Triggering Condition Parameters ⟋320 | Triggering Parameter Values ⟋330 | Absolute Layer Priority Settings ⟋340 |
|---|---|---|---|---|
| Highest | Emergency | 1. National Emergency Alert 2. Local Emergency Alert | 1. National Emergency Y/N 2. Local Emergency Y/N | (1) Spread Traffic in Emergency Area (2) Steer Traffic From Emergcy Area |
| 1 | Network Load (handling high network data traffic volume) | 1. PRB Utilization 2. Volume/Time 3. Connected Users | 1. Percent Utilized 2. Bytes/time 3. No. Conn. Users | Highest priority to highest capacity layer(s) |
| 2 | Mobility Behavior (handling of high frequency of handovers) | 1. Edge of Coverage Indicator 2. Handover Attmpt 3. Handover Succ. Rte | 1. Position 2. Handover Attmpt 3. Percent Success Handovers | Highest priority to layer with best handover characteristics |
| 3 | UE Carrier Aggregation Supported | 1. Supported Y/N 2. Supported band combinations | 1. Support Y/N 2. LTE Layers that are combinable | Highest Priority to Aggregated Layers |
| 4 | Newer UE 3GPP Releases Supported (comprehensive service/app support with minimal signaling) | 1. 3GPP Release 8 or later Supported Y/N 2. 3GPP Release Number Supported | At least one layer supports stated 3GPP Release Number | Highest priority assigned to layer(s) meeting/exceeding stated 3GPP release number |

SYSTEM AND METHOD FOR MANAGING FREQUENCY LAYER PRIORITY ASSIGNMENTS WITHIN MOBILE WIRELESS NETWORK RADIO INTERFACES

FIELD OF THE INVENTION

This invention relates generally to the field of mobile wireless communications networks and associated services. More particularly, the invention is directed to mobile wireless data communication services (such as those supporting data flows to/from smart phones) supported by such networks, and more specifically to managing operation of the radio access signal transmission and reception infrastructure (e.g., cell sites, and more particularly eNodeB cells) within the mobile wireless networks (e.g. Long Term Evolution "LTE" networks).

BACKGROUND OF THE INVENTION

Proliferation of smart phones, and their subsequent use to perform high data-rate communication, has resulted in an exponential growth in the volume of data flowing over wireless networks. The increased volume of data flowing over the networks is taxing the service providers and the legacy network infrastructure responsible for ensuring the data reliably flows for most, if not all, users.

Furthermore, the introduction of a new generation of mobile wireless networks based upon 3GPP Release 8 and later mobile wireless standards (e.g., fourth generation Long Term Evolution "4G LTE") and associated communications infrastructure has indeed substantially increased the throughput capabilities of mobile wireless networks for users that subscribe to and use 4G services. Thus, the newest generation of mobile wireless network technologies has created increasingly high expectations by users with regard to both reliability and quality of service of mobile wireless networks. The high degree of reliability achieved by mobile wireless services has resulted in many mobile wireless subscribers foregoing conventional landline voice and/or data network services. Such subscribers rely wholly upon mobile wireless service to meet their communication needs.

Given the increased expectations and reliance of subscribers on mobile wireless network services, it is imperative for the underlying mobile wireless network infrastructure to be properly maintained. When parts of the mobile wireless network infrastructure are unable to adequately support subscriber needs and expectations at particular locations in the network, such parts (e.g., cell sites or portions thereof) must be quickly identified and remedial action taken. Thereafter, the cause(s) of the identified performance failure need to be identified and addressed. However, identifying the cause of poor data transmission service and the remedy for the poor service is not a trivial endeavor.

To address the above needs, operators deploy LTE technology using multiple frequency layers, also referred to as "channels." Each layer is specified by a 3GPP Release 8 (or newer) Frequency Band consisting of a specified center operating frequency as well as a configured bandwidth for the individual (sub)channels within the general frequency band. In view of the presence of multiple supported frequency layers, the 3GPP Release 8 (and newer) standards specify/define a procedure and a parameter setting, referred to herein as an absolute frequency layer priority. The absolute frequency layer priority setting is provided by a radio access node (e.g. an eNodeB macrocell) to a User Equipment (UE) device, such as a smartphone mobile wireless device, within range of the radio access node seeking to connect to a cell/sector associated with the radio access node. The absolute frequency layer priority setting specifies values indicating a recommended order of preference for selecting one of the supported frequency layers when connecting to the radio access node. In known radio access networks, the absolute frequency layer priorities are assigned manually and do not change unless manually re-configured by the radio access network service provider.

The current disclosure is directed to examples relating to LTE mobile wireless networks, and more particularly the ability to assign particular priorities to specific frequency layers for LTE eNodeB macrocells. This setting is a control information element (IE) consulted by UEs during a LTE Cell Reselection event. Per the LTE standard, a UE selects a requested frequency layer, on which to attempt establishing a connection via a radio link with an eNodeB cell, based on absolute radio frequency layer priorities assigned to the respective radio frequency layers for that eNodeB cell. In the case of LTE technologies, the priorities can be set anywhere within a range of 0 to 7, with 7 being the highest priority. Multiple cells (also referred to as "sectors" in non-LTE radio access link technologies) may overlap and therefore cover a same (overlapped) geographical area, and the cells and/or sectors may have the same or different absolute frequency priority assignments.

According to the 3GPP release 8 and the LTE standard, the absolute frequency priority setting is considered during: (1) inter-frequency cell reselection, (2) idle mode mobility control info, and (3) redirected carrier events. During inter-frequency cell reselection events, UEs access an absolute frequency priority IE from a provided System Information Block 5 (SIB5) that contains cell reselection parameters for inter-frequency cell reselection. Thereafter, the UEs compare the absolute frequency priorities from SIB5 to the absolute frequency priority configured on the currently serving frequency layer as indicated in System Information Block 3 (SIB3)—Cell Selection and Cell Reselection Parameters for Intra-frequency events. The comparison is used to determine whether the steps for inter-frequency cell reselection should be initiated on the UE—if the currently serving frequency layer has a lower priority than a priority value of another layer specified in SIB5.

In other scenarios, idle mode mobility control information and redirected carrier events cause initiation of operations on UEs that consult the absolute frequency layer priority setting of a cell/sector to initiate inter-frequency cell reselection event following a Radio Resource Control (RRC) Connection Release message used to manage airlink access resources. The RRC Connection Release message may contain a list of frequency layers and their assigned priority values as IEs to be considered for inter-frequency cell reselection during idle mode mobility. This same RRC Connection Release message can specifically contain the redirected carrier information IE specifying radio frequency layer priority values by Evolved Absolute Radio Frequency Channel Number (EARFCN) upon which the UE should rely to perform cell reselection following an RRC Connection Release.

In an LTE environment, an Absolute Frequency Priority (AFP) IE is contained in: (1) a System Information Block 3 "SIB3" (Intra-frequency information) message; (2) a System Information Block 5 "SIB5" (Inter-frequency information) message; and (3) an RRC Connection Release Idle Mode Mobility Information with associated EARFCN message. The AFP IE is considered for RRC Connection Release Redirected Carrier Frequency IE (for this redirection, the EARFCN is the indicated IE based on its priority). Moreover, the absolute priority, when specified in each of the above-described message types, is specified by an integer value between zero (0) and seven (7), with zero being the lowest and seven being the highest priority. Priorities are assigned to frequency layers at an eNodeB cell level of granularity, and can have equal or different assigned values at the various levels.

In the known LTE environment an authenticated UE within LTE coverage can be in either an RRC-Connected state or an RRC-IDLE state. In the case of the UE in RRC-Idle state, system information is considered for frequency assignment, including SIB3 and SIB5 information (i.e., absolute frequency layer priority values are indicated). In the case of the UE in an RRC-Connected Mode, cell reselection is driven by RRC Connection Release event messaging. During the cell reselection redirected carrier information provides direction to selection of other specific frequency layer EARFCN (rule is set based on absolute frequency priority setting). Moreover, idle mode mobility information indicates available radio frequency layer (EARFCN) choices and associated absolute priorities to consider for UE measurement reporting and possible cell reselection.

Importantly, radio frequency layer priority configurations are relatively static and require manual intervention to change. Direct operator action is needed to carry out modifying absolute frequency priorities.

SUMMARY OF THE INVENTION

Embodiments of the invention are used to provide a system and method for managing radio frequency layer priority settings for radio access network nodes in a mobile wireless network. The method is carried out by a programmed server configured with an initial configuration of the trigger definitions and corresponding radio frequency layer priority settings. The method includes applying, by the programmed server, current conditions bearing upon a conditional area to a conditional area trigger definition. The method also includes issuing, by the programmed server based upon the applying, a message to re-designate radio frequency layer priority settings for a cell. Additionally, the method includes receiving, by the programmed server after the issuing, network characteristics feedback.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Numerous aspects of a wireless network that effect loading and/or preferences for a particular set of absolute frequency layer priorities are not static. At different periods of loading, mobility, emergency state, or UE type distribution, one frequency layer may be more preferable than others and at other times the inverse may be true. It is quite cumbersome and impractical to expect the operator to manually manage frequency priority in such networks.

In various examples of the self-reconfiguring radio access network environment described herein, a system (self optimizing network) server acquires various types of status information bearing upon needs and current operation of the network, including status information relating to: emergency state, mobility, network loading, UE distribution, and UE service request types. Such information is provided via performance measurements and other back-end support systems. Based upon configured logic, the system server designates a current set of radio frequency layer priorities on a per-radio frequency layer/channel basis. The layers/channels will be referred to herein below as layers in association with an illustrative example based upon 4G LTE radio access interfaces based on 3GPP release 8 and later standard publications. Thus, in the context of 4G LTE, a cell carries out over-air communications with UE units through a set of available layers, and each layer is individually assigned a layer-specific priority value. Adapting the radio frequency layer priorities in response to currently sensed radio access network conditions (e.g. triggering parameter values), and/or needs, presents the possibility for radio access network cells to modify, without human intervention, radio frequency layer priorities according to configured preferences. The modifications to the radio frequency layer priorities enable the cell (or a group of neighboring cells) to more effectively meet highly variable needs of UE units seeking to connect to the cell(s). Thus, incorporating frequency layer preferences into determinations of frequency layer priorities enables "preference-based" steering of radio network interface traffic to more suitable frequency layers in response to currently sensed/observed conditions. Such steering may be important, for example, as designating a high priority for a certain layer may be preferred in periods of high mobility (large number of users operating at the edges of two adjacent cells where signal interference is likely to be the greatest) while another set of radio frequency layer priority designations may be preferred in times of high communication load by relatively fixed UE units within a geographic region serviced by a particular cell.

The figures and associated written description provide illustrative examples of a system and method for supporting and carrying out re-designating radio frequency layer priority settings for one or more radio transceiver structures (e.g. a cell site, a sector, etc.) in response to sensed conditions and/or alerts affecting particular cells.

Figure 1:
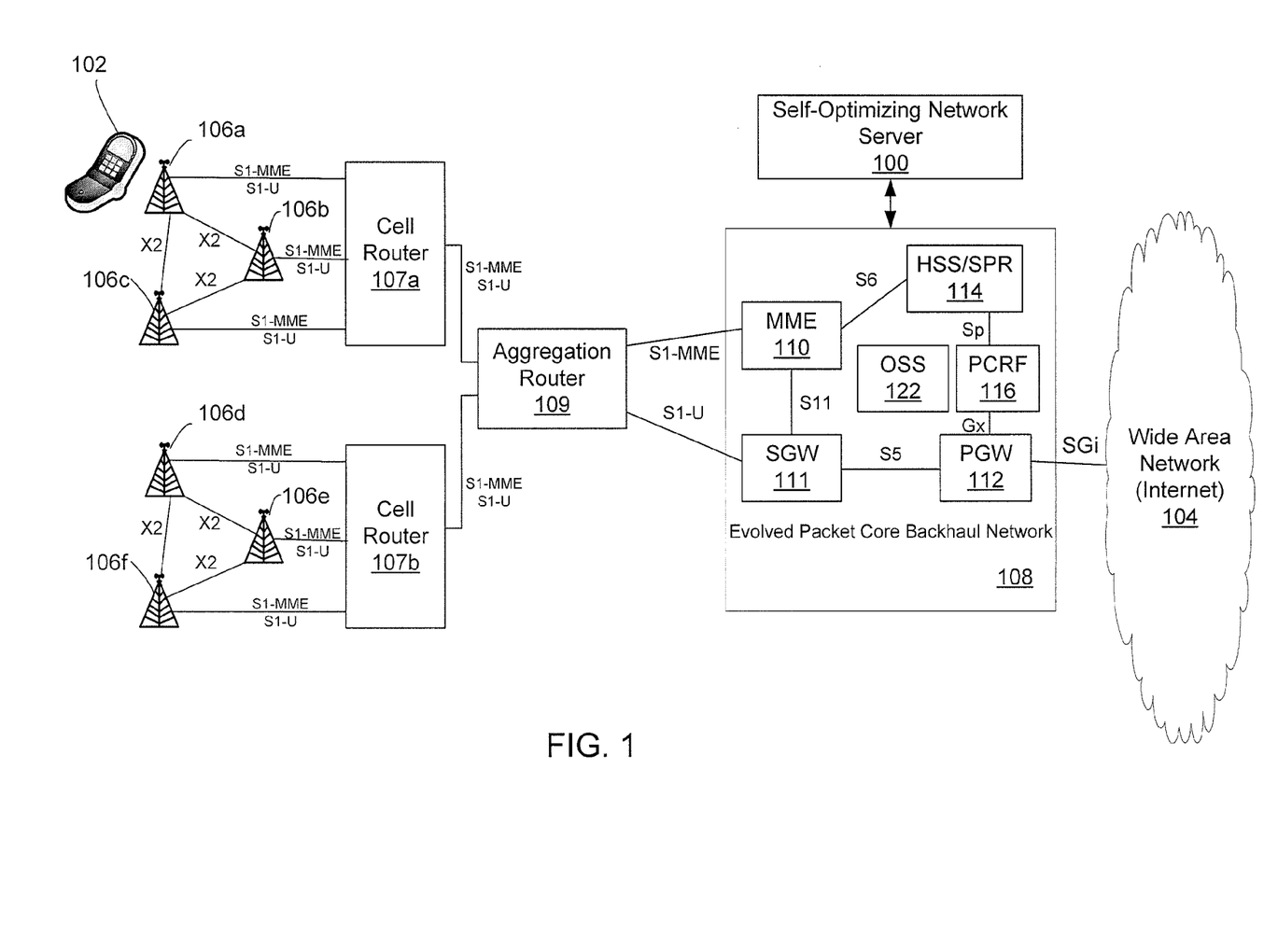
FIG. 1 is a schematic diagram illustrating a mobile wireless network environment interfacing a broadband digital data network through which a variety of broadband network resources (e.g., Internet-based content provider services) are accessed by mobile wireless devices in accordance with embodiments of the invention.

Turning to FIG. 1, a schematic diagram depicts physical/structural components of an exemplary (e.g., LTE or Long Term Evolution) mobile wireless data network environment. The environment depicted in FIG. 1 is substantially simplified, as one skilled in the art would readily observe, to focus upon the operation of a self-optimizing network (SON) server 100 configured to execute operations affecting radio frequency layer priority settings on macrocells 106a-f. The SON server 100 comprises a processor for executing computer-executable instructions stored on a non-transitory computer-readable medium including computer-executable instructions and data structures for facilitating configuring radio frequency layer priority re-designation logic and thereafter carrying out the functionality described herein relating to re-designating radio frequency layer priorities for a cell of a radio access network for a mobile wireless radio network service provider.

With continued reference to FIG. 1, a mobile wireless device 102 (a type of UE), such as a smartphone or mobile wireless enabled tablet computer, establishes and carries out data communications with a variety of resources on a wide area network (WAN) 104 (e.g. the Internet) via radio communications links supported by the macrocells 106a-f. In an exemplary embodiment the macrocells 106a-f are LTE eNodeB macrocells that incorporate the evolved UMTS Terrestrial Radio Access Network (E-UTRAN) air interface specified by the Third-Generation Partnership Project (3GPP) LTE radio interface specification for mobile wireless communications.

Moreover, inter-cell wireless communications are carried out between neighboring ones of the macrocells 106a-f. More particularly, the eNodeB macrocells coordinate handover of a mobile wireless network session between eNodeB macrocells via an X2 interface which is also defined within 3GPP specification (3GPP TS 36.423 "Evolved Universal Terrestrial Radio Access Network (E-UTRAN); X2 Application Protocol (X2AP)"). The X2 interface is presently used by eNodeB nodes of a same service provider to coordinate handover, from a source eNodeB to a target eNodeB, of a moving mobile wireless device such that no data packet loss occurs while the target eNodeB takes over an existing mobile wireless data network session from the source eNodeB. The X2 interface is also used by a source eNodeB to transmit (e.g. forward, tunnel, etc.) unsent and/or unacknowledged packets on the source eNodeB to a target ENodeB during a handover between eNodeBs.

The X2 interface is also configured to support a mesh network topology for eNodeBs. In such topology the eNodeBs support routing/tunneling data packets between mobile wireless devices and packet switched core backhaul networks through multiple eNodeB cells. Such routing/tunneling enables the eNodeBs to balance traffic load over S1 interfaces and/or provide redundancy in the case of failure of an S1 interface connection/link between an eNodeB macrocell and a corresponding packet switched core backhaul network. The X2 interface is also potentially used to enable multiple neighboring cells to coordinate their designations of radio frequency layer priorities to carry out a layer priority scheme covering a geographic area going beyond the reach of a single cell.

As shown in the drawings, the macrocells 106a-f provide access, by the mobile wireless device 102, to the WAN 104 (e.g. the Internet) via an evolved packet core backhaul network 108. The macrocells 106a-f, in accordance with the 3GPP specification, support S1 interface (e.g. S1-U and S1-MME) connections with the packet switched core backhaul network 108 maintained, for example, by a mobile wireless data network service provider. The connections between the macrocells 106a-f and the evolved packet core backhaul network 108 are facilitated, in the illustrative network, by a multi-level data routing scheme comprising a first cell router 107a connected to macrocells 106a-c and a second cell router 107b connected to macrocells 106d-f. An aggregator router 109, in turn, routes the signals from the first cell router 107a and the second cell router 107b to the evolved packet core backhaul network 108. The packet switched core network 108 is communicatively coupled to the WAN 104 via an SGi interface.

With continued reference to FIG. 1, the evolved packet core backhaul network 108 includes a set of components facilitating management of mobile wireless data network sessions supporting data communications between the radio access network, comprising the macrocells 106a-f and desired resources on the WAN 104. In particular, the core backhaul network 108 includes a mobility management entity (MME) 110 that communicates with the macrocell 106a via an S1-MME interface. The S1-MME interface is well documented and will not be described here. The MME 110 incorporates functionality for maintaining the network connection to eNodeBs, such as the macrocell 106a. More particularly, the MME 110 manages a connection to the mobile wireless device 102 routed to the core backhaul network 108 via the macrocell 106.

The packet switched core backhaul network 108 also includes a serving gateway (SGW) 111 that communicates with macrocells (e.g. macrocell 106a) via an S1-U interface and the MME 110a via an S11 interface. The functionality of the SGW and the S1-U and S11 interfaces is well-documented and will not be described here. The SGW 111, among other things, supports roaming by the mobile device 102 in the networks of other service providers as well as charging for tracked data usage by visiting mobile devices.

The packet switched core backhaul network 108 also includes a packet data network gateway (PGW) 112 that manages aspects of the sessions between user equipment, such as the mobile device 102 and the WAN 104 (e.g., the Internet). Responsibilities of the PGW 112 include: IP address allocation to user equipment for the session, enforcing QoS, and charging an account based upon an associated subscription and actual data flow by the particular user equipment during a session.

An Operating Support System (OSS) 122 serves as a central point for administration, management, and provisioning of all network elements, including the eNodeB macrocells 106a-f. Among other things, the OSS 122 administers the LTE radio access network (RAN) configuration specified for each of the macrocells 106a-f. Such priority settings are maintained, for example, on a per cell basis, using LTE nomenclature, for the macrocells 106a-f. The OSS 122 thereafter issues configuration update messages to individual ones of the macrocells 106a-f to implement the newly updated priority settings in the macrocells 106a-f. In the illustrative embodiment, the OSS 122 is configured to acquire performance measurements and any other current status information (provided to the SON server 100) bearing upon the: (1) triggering thresholds for newly updated priority settings, (2) the designation of new priority settings, and (3) keeping new settings (or reverting back to previous ones) in view of system operation (KPI) feedback. The performance information is obtained by the OSS 122 through a connection to the MME 110. The OSS 122 also communicates with the SON server 100 to provide the KPI and other status information to the SON server 100 and obtain the resulting radio frequency layer priority settings rendered by the SON server 100.

The evolved packet core backhaul network 108 also includes a HSS/SPR 114 for allowed network access confirmation and subscriber profile information. These components confirm accessibility options to allow the UE successful accessibility to the frequency layers of the radio access network.

The packet switch core backhaul network 108 also includes a policy charging rule function (PCRF) 116. The PCRF 116, in the context of illustrative examples of the present invention provides guidance to the enforcement functions within the PGW allowing user plane access.

The illustrative mobile wireless data network infrastructure/environment depicted in FIG. 1 is not intended to limit the invention with regard to alternative network topologies. Rather, it is intended to provide a visualization of a network architecture supporting the operation of the SON server 100 to: (1) re-designate radio frequency layer priority settings for individual ones of the macrocells 106a-f in accordance with a currently configured rule set (triggering threshold values and corresponding priority settings) in accordance with a variety of detected conditions and states of network operation; and (2) change the trigger threshold values that invoke re-designating priority settings based upon feedback (e.g. KPI values) indicating whether performance of the radio interface improved as a result of the new priority settings. The SON server 100 also issues previous priority settings to the OSS 122 in the event that re-designating radio frequency layer priority settings did not improve radio access performance (per KPI feedback analysis by the SON server 100). In fact, with regard to network topologies, while the macrocells 106a-f are identified in FIG. 1, the radio interfaces may alternatively be femtocells, picocells, or any other type of radio signal interface utilized by the mobile wireless device 102.

With continued reference to FIG. 1, the operation of the illustrative mobile wireless data network is enhanced by automated monitoring and re-configuration functionality incorporated into the SON server 100 that carries out configured automated self-optimization operations to tune operation of, among other things, the radio interfaces of the macrocells 106a-f. In particular, the SON server 100 receives device (e.g. mobile device 102) and network status/quality/performance information about one or more cell sites/sectors for which the SON server 100 has configuration and monitoring responsibilities/permissions. Such information is received via a messaging interface between the SON server 100 and, for example, the OSS 122 of the evolved packet core backhaul network 108. The SON server 100 also receives information, such as emergency information via a broadband data network connection to the WAN 104. The device and network status/quality/performance information indicates conditions potentially bearing upon a current designation of radio frequency layer priorities for one or more cells/sectors under the configuration control of the SON server 100. The SON server 100, in turn, processes the received information in accordance with a current configuration of radio frequency layer re-designation triggering and execution logic. More particularly, radio frequency layer priority settings re-designation operations are invoked on the SON server 100 (presented in additional detail in FIG. 2), for a particular cell site and/or sector, based upon changes in one of more of the following configurable conditional areas: (1) radio network infrastructure conditions, (2) radio network load conditions, (3) radio network user behaviors, (4) and an emergency. Thereafter, the SON server 100 specifies frequency layer priorities for each frequency layer on the cell site/sector of interest based upon the triggering condition(s) and a current configuration of the frequency layer priority assignment logic (see FIGS. 3 and 4). The operation of the frequency layer priority re-designation operations configured within and executed by the SON server 100 is described herein below with reference to FIG. 5. The SON server 100 then communicates radio frequency layer priority re-designation messages to the OSS 122 for communicating appropriate re-configuration messages to a macrocell for which priority settings were re-designated.

The functionality and operation of the SON server 100 and related network components, depicted in FIG. 1, is described herein below with reference to illustrative structures and steps described herein with reference to FIGS. 2-6. The discussion of FIGS. 2-6 herein below focuses primarily upon enhanced configuration functionality with respect to the radio frequency layer prioritizations specified for individual cell interfaces. Such enhanced layer priority setting re-designation functionality facilitates greater responsiveness of the radio network to changing operating conditions and statuses—including emergency conditions affecting operation of one or more of the macrocells 106a-f of the mobile wireless data network radio access network depicted in FIG. 1.

Figure 2:
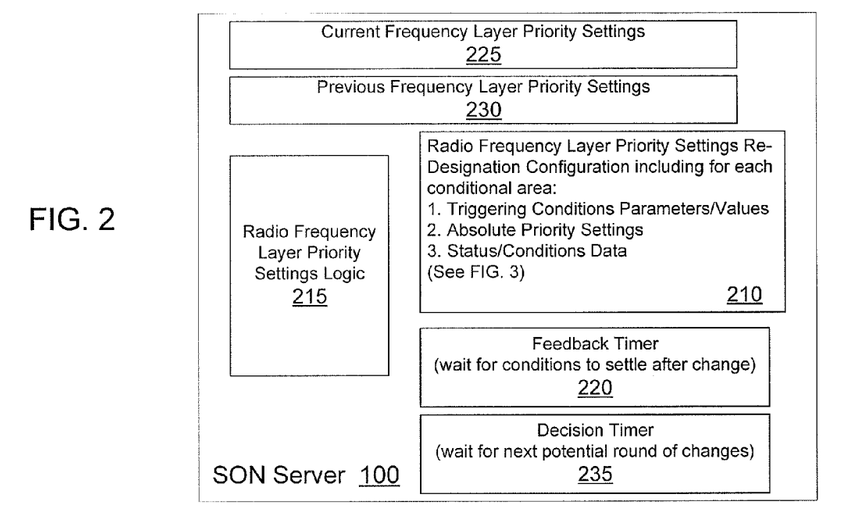
FIG. 2 is a schematic diagram identifying components incorporated within a Self-Optimizing Network (SON) server to trigger and execute logic for re-designating radio frequency layer priority settings on a cell/sector of a radio interface.

Turning to FIG. 2, an exemplary schematic diagram of the SON 100 is depicted. A priority settings re-designation configuration 210 comprises configurable data structures (see, FIG. 4) specifying conditional areas for which re-designation of current radio frequency layer priority settings may occur. With regard to each conditional area, the re-designation configuration 210, applied by radio frequency layer priority settings logic 215, specifies: (1) triggering condition parameters, (2) resulting absolute frequency layer priority setting re-designations (e.g. a value between 0-7 for LTE eNodeBs) in response to meeting the specified triggering conditions for re-designating the priority settings, and (3) current values of the triggering condition parameters that activate a condition state resulting in applying the specified frequency layer priority settings. The configuration definitions within the configuration 210 are highly configurable—both automatically (using self-tuning, current status feedback-based operations) and manually. The only static configuration values being aspects of the "emergency" conditional area where the precedence of the area is always the highest and the trigger threshold parameters and values are permanently set in accordance with, for example, values required under federal regulations.

The radio frequency layer priority settings logic 215 comprises configurable computer executable instructions executed on a processor to carry out the logic, in accordance with the configuration specified by the re-designation configuration 210.

Additionally, the SON server 100 includes a feedback timer 220 specifying a period of time the priority settings logic 215 waits, after specifying new priorities for a cell in response to a triggering condition, to measure resulting conditions to decide whether to keep a new set of priority settings 225 or revert to a previous set of settings 230. Generally, the time period of the feedback timer 220 is set to permit new priority settings to take effect in the system and permit the OSS 122 to receive and provide resulting radio access network conditions (e.g. KPI's) to the SON server 100. Depending on the degree of changes and the conditions triggering the re-designation of settings, the time period could be a few minutes, several minutes, or even an hour. However, the time duration specified in the feedback timer 220 should not result in undesirable degradation of the system for an extended period of time. Therefore, an exemplary value for the feedback timer 220 is a minimum of 15 minutes.

The exemplary SON server 100 also includes a decision timer 235 specifying a period of time the priority settings logic 215 waits before commencing a next application of the priority settings logic 215 to the re-designation configuration 210. The value assigned to the decision timer 235 is a matter of choice, depending upon the goals of the administrator. A short time period for the decision timer 235 results in "real-time" decision making. However, satisfactory performance can probably be achieved by running the settings logic hourly, daily or even less often. Regardless of the choice for the time duration of the decision timer 235, the resulting time between iterations of the decision logic executed by the priority settings logic 215 should always exceed the time period of the feedback timer 220. Such requirement can be implemented by starting the time period specified by the decision timer 235 after completing a wait period specified by the feedback timer 220 in accordance with the operations, performed by the logic 215, summarized in FIG. 5.

Moreover, both the feedback timer 220 and the decision timer 235 are reconfigurable. Such reconfiguration may arise, for example, as a result of a detected conditional state. The need to analyze feedback and perform a next iteration of the decision logic may be dependent upon the "mode" of the decision logic—the conditional area (see FIG. 4) that was triggered to cause a re-designation of the frequency layer priority settings. For example, the time durations associated with the "emergency" mode may be the shortest (and possibly non-editable) to facilitate both quick adjustments to meet an urgent need and to ensure that any changes to priority settings that result in degraded performance do not persist for an extended period of time.

Figure 3:
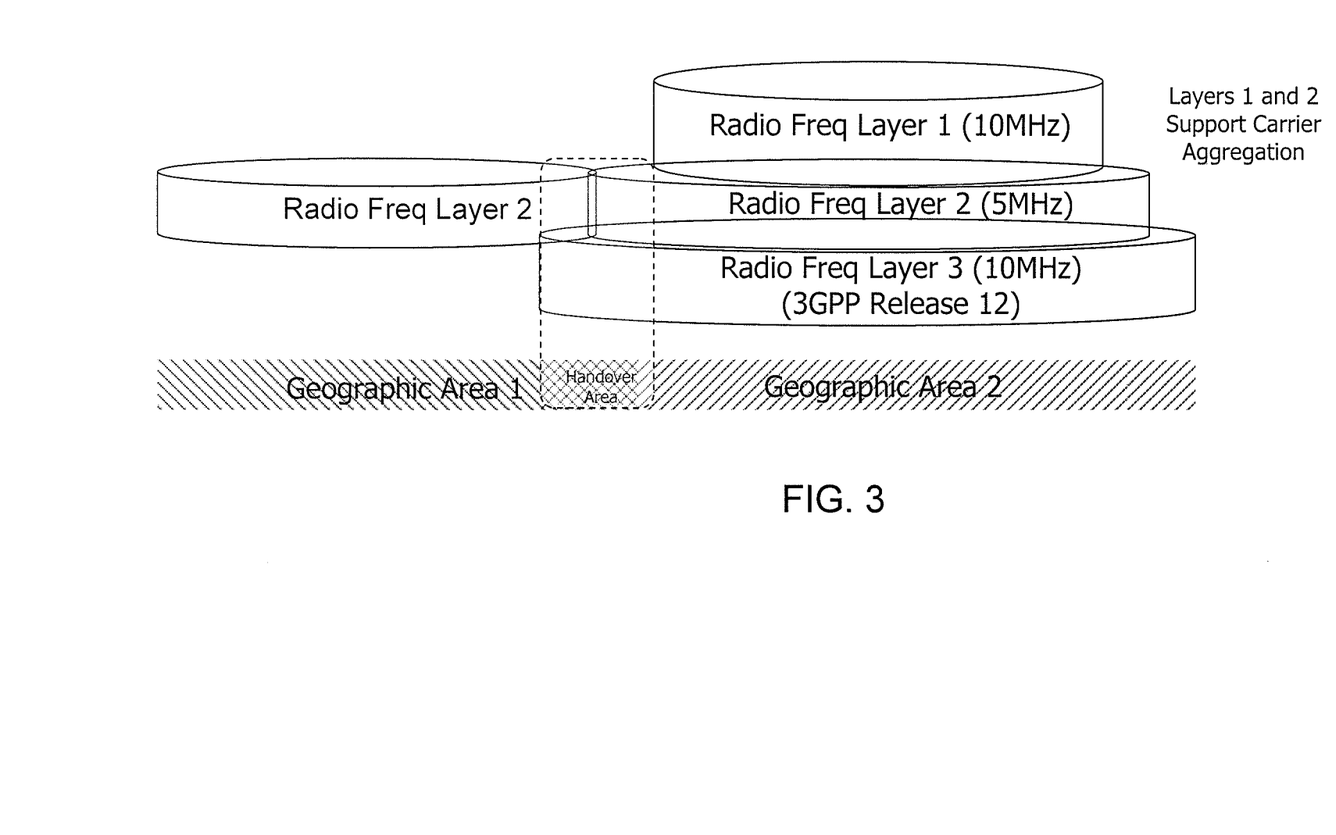
FIG. 3 is a diagram illustratively depicting conditional areas and geographically overlapping conditions potentially leading to re-designation of layer priority settings.

Turning to FIG. 3, a schematic drawing is provided that is intended to summarize various scenarios applicable to a set of non-emergency "conditional areas" that may cause the logic 215 of the SON server 100 to specify a set of radio frequency layer priorities for the three layers supported by a first cell corresponding to geographic area 2 which neighbors geographic area 1 served by a second cell. The following are observed of the scenarios arising from the topographical/functional relations of the cells corresponding to geographic areas 1 and 2:

1. Due to Large Channel Bandwidth and small coverage area, better handling of UE need may be achieved if layer 1 is assigned a high priority layer, along with layer 3 during low (inter-cell switching) mobility traffic pattern periods due to their higher (10 MHz) bands—in comparison to layer 2 (5 MHz).

2. Due to shared minimal overlap at layer 2 for the two cells for geographic area 1 and geographic area 2, better handling of cell handovers may be achieved if layer 2 is assigned a highest priority during high inter-macrocell (eNodeB) mobility periods between the cells for geographical area 1 and geographical area 2. Layer 3 is assigned a next highest priority (would require re-tuning the UE at the cell-transfer), and Layer 1 is assigned a lowest priority (insufficient geographic reach to permit direct transition from layer 1 of geographic area 2 to layer 2 in geographic area 1).

3. Due to the ability of the cell at geographic area 2 to combine the bandwidth of layer 1 and layer 2 into a single "aggregated layer", in cases of high usage favoring management of layers as a single layer, layers 1 and 2 are assigned a higher priority than a priority assigned to Layer 3.

4. Due to the relative advanced protocol handling (3GPP Release 12), layer 3 is assigned a higher priority than layers 1 and 2 to minimize set up signaling when a substantial percentage of user equipment is requesting relatively advanced services requiring the newer 3GPP Release 12 that cannot be handled by relatively older 3GPP releases currently implemented by layer 1 and layer 2 of the cell for geographic area 2.

Figure 4:
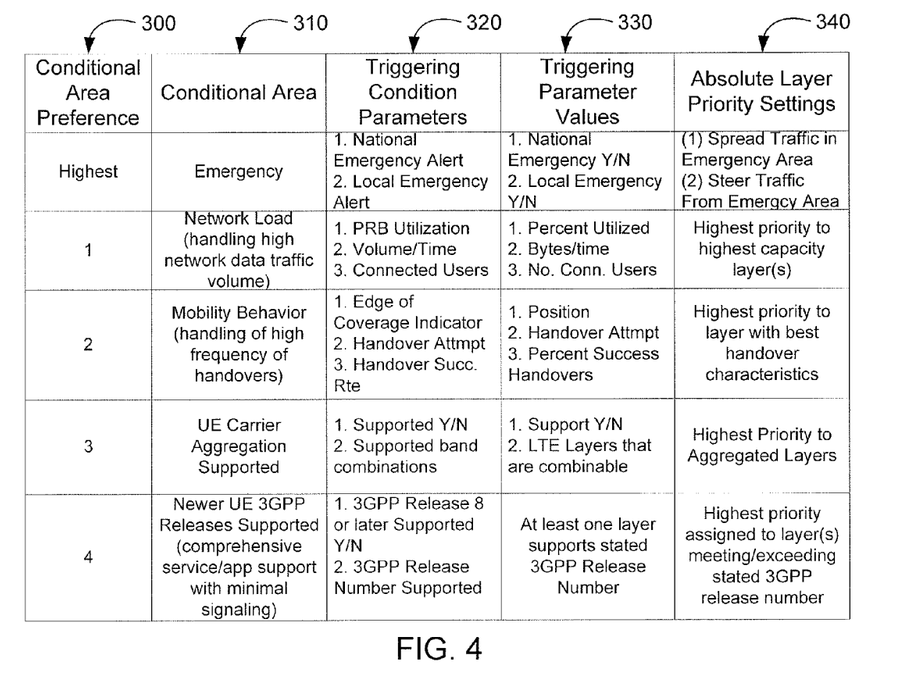
FIG. 4 is a table summarizing a set of configurable fields that control triggering and subsequent modifications to radio frequency layer priority settings for a radio interface of a cell/sector in a radio access network.

Turning to FIG. 4, a table includes descriptions of fields (mostly configurable) that control triggering and subsequent modifications to radio frequency layer priority settings for a radio interface of a cell/sector in a radio access network. A decision area preference column 300 specifies a precedence level for a given conditional area. Triggering conditions are tested first for a conditional area having the highest level of precedence (e.g. emergency). Thereafter, the triggering conditions for conditional areas are tested in descending order of precedence, until a triggering condition for a conditional area are met, or no triggering conditions are encountered for each conditional area. A conditional area 310 provides a brief identification of a conditional area. A triggering condition parameters 320 specifies a parameter value that is tested and a triggering values 330 specifies values for the parameters specified in the conditional parameters 320. An absolute frequency layer priorities settings 340 specifies changes to render a new set of priority values assigned to each frequency layer when the triggering conditions for the conditional area are met.

With continued reference to FIG. 4, the "emergency conditional area" is triggered by a national or local emergency message broadcast. In response a number of potentially very different re-designation settings are contemplated. In the case of a national or widespread emergency, the priorities of each layer art set equal to one another in an attempt to "spread" usage across all supported layers to fully utilize all the layers/bandwidth provided by the cells. However, in the case of a very localized emergency, an entirely different pattern is used wherein an attempt is made to "clear" a layer for use solely within a geographic area where the emergency is located. In that case, a high bandwidth layer is selected for the cell contained within the emergency area, and a complementary priority scheme is assigned to all neighboring cells to minimize interference in the communication attempts by persons (emergency responders) within the emergency area.

The "network load condition area" is triggered by various KPIs indicating high usage by UE units within the geographic area served by the cell. In such circumstances, a highest layer priority is assigned to the layer(s) (e.g., Layers 1 and/or 3 in FIG. 3) having the best bandwidth/throughput characteristics. Since layer 2 in the illustrative example of FIG. 3 is 5 MHz, as opposed to 10 MHz for layers 1 and 3, layer 2 is assigned a lower priority than at least one of Layers 1 and 3 (preferably both) when the "network load condition area" is triggered by current conditions observed in the geographic area of the cell of interest.

Continuing with the description of FIG. 4, the "mobility behavior condition area" is triggered by various KPIs indicating high mobility of UE units between the cell and a neighboring cell associated with another geographic area (see geographic areas 1 and 2 of FIG. 3). In such case, priority settings for the cell are re-designated to steer users to the layer (layer 2 in the example provided in FIG. 3) that results in the least signaling overhead by the cell to handle handovers to the cell associated with the neighboring geographical area 1. Layer 2 was chosen for the example of FIG. 3 because of the overlap of signal coverage between the layer 2 of geographic area 2 and an available layer 2 in the neighboring geographical area 1.

The "carrier aggregation condition area" is triggered when the cell of interest is capable of combining two layers (e.g. layers 1 and 2) such that the two layers are managed as a single "aggregated" layer having a substantially larger bandwidth/throughput. Aggregating layers potentially results in reduced signaling overhead arising from overcrowding in a single, non-aggregated highest priority layer. In such instances, the aggregated frequency layers are assigned the highest priority.

The "newer 3GPP release supported conditional area" is triggered by a presence of a layer that supports a newer release (e.g. 3GPP release 12) and is therefore favored over legacy layers that may not support applications and services associated with newer UE units. In the illustrative example of FIG. 3, layer 3 meets such a criterion and is therefore assigned the highest priority when this conditional area is "triggered" within the logic 215 executing the operations summarized in FIG. 5 described herein below.

Figure 5:
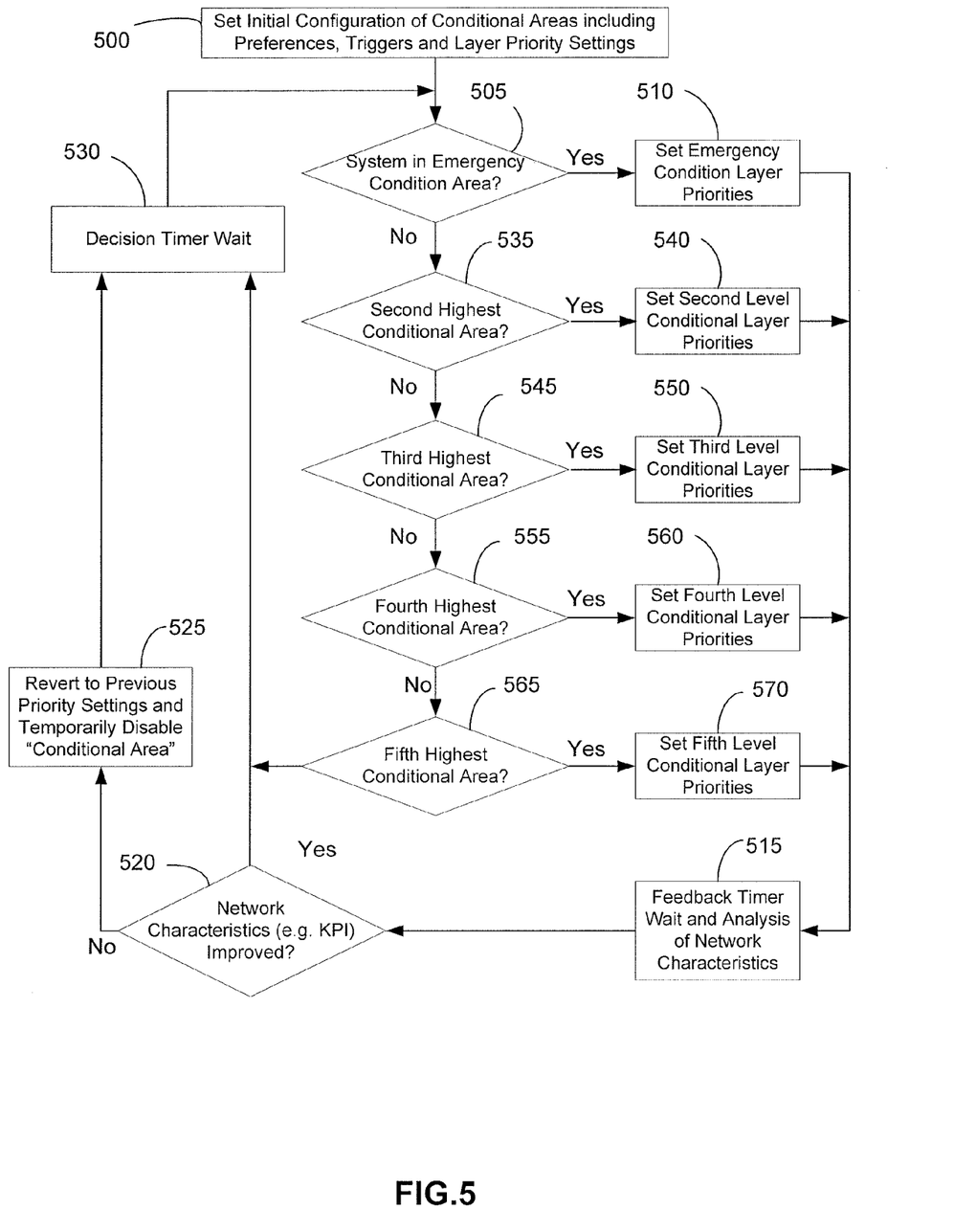
FIG. 5 is a flowchart summarizing operation of the SON server to automatically re-designate radio frequency layer settings for a cell radio interface in accordance with a configured set of re-designation triggers and resulting remedial changes to previously specified radio frequency layer priority settings.

Turning to FIG. 5, a flowchart summarizes operation of the SON server 100 to automatically re-designate radio frequency layer priority settings (and triggering thresholds for conditional areas) for a macrocell radio interface in accordance with a configured set of re-designation triggers and resulting remedial changes to previously specified radio frequency layer settings. Initially, during 500, the SON server 100 is configured with an initial configuration of the triggers definitions and priority settings for the conditional areas depicted in FIG. 4. Thereafter, the frequency layer priority settings logic 215 commences operation wherein during 505, if the system meets the triggering conditions for the "emergency" mode then control passes to 510 wherein configured emergency priority settings are specified for re-designation of priority settings in the macrocell of interest. Control then passes to the feedback stage 515.

During the feedback stage 515, the settings logic 215 waits for a period of time specified by the feedback timer 220. During execution of the feedback stage 515, the SON server 100 receives and processes a variety of feedback KPI information. Such information includes, for example, all the KPI's specified by 3GPP Specification 34.451 (or newer) as follows: Per user throughput, Ineffective Attempt Success Rate, Dropped Connection Rate, Successful Handover Rate, number of Physical Resource Blocks Assigned per user, (Number of Handover Attempts)/(Number of Active RRC Connections)—a Mobility indicator, number of Connected Users, and Network CPU Resource Utilization.

Figure 6:
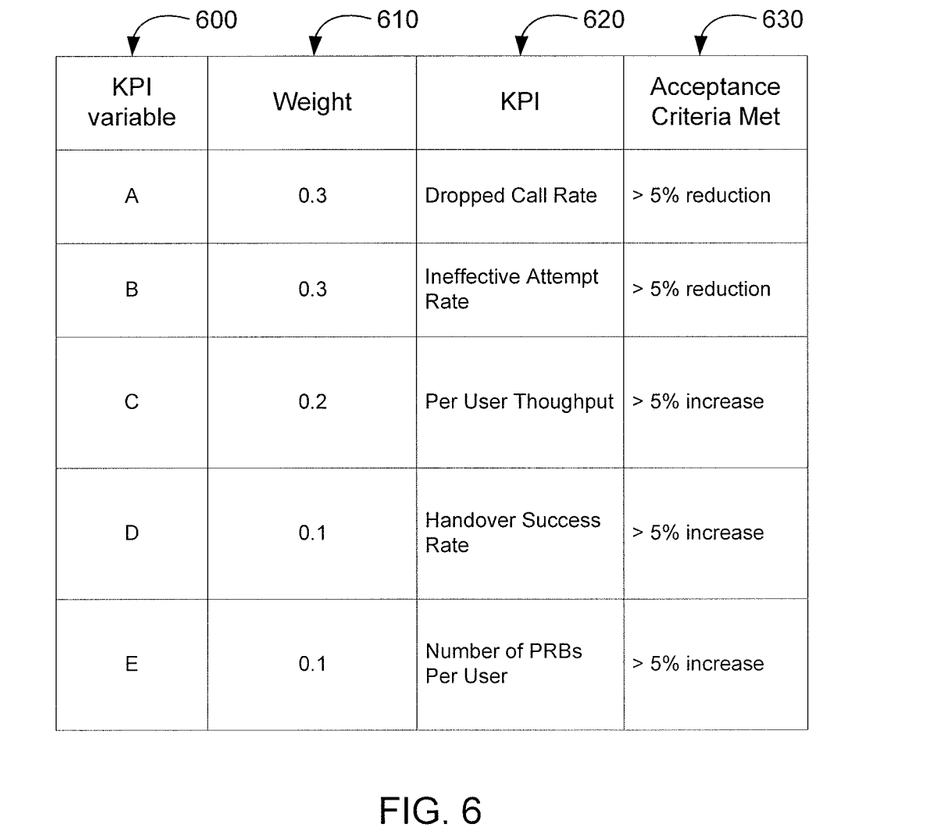
FIG. 6 is a table summarizing a set of configured weights for a set of KPIs used to determine whether to keep previously re-designated priority settings.

Thereafter, during a decision stage 520, the SON server 100 determines whether the KPI's demonstrate an overall improvement in the performance of the radio access network interface after implementing the most recent priority setting re-designation. An example of an such a criterion, incorporating a weighting scheme to the KPI feedback measurements, is summarized in the Table provided in FIG. 6 that depicts a set of configured weights (column 610) for a set of identified KPIs (columns 600 and 620) used in a formula executed by the logic 215 to determine/decide whether to keep the current frequency layer priority settings 225 (the re-designated priority settings) or revert back to the previous frequency layer priority settings 230. In the illustrative example, the total of the weights equal 100%, and passing a threshold—summarized in column 630 (e.g., a 5 percent reduction in an observed bad event or a 5 percent increase in an observed good characteristic) with regard to each weighted category results in a value of 1 for that weighted KPI category (or a zero if the specified improvement threshold test failed). Thus, during stage 520, the SON server 100 carries out the threshold tests for KPI improvement and generates an overall improvement score for the most recently implemented re-designation of frequency layer priority settings in the macrocell of interest. By way of example, upon completion of the threshold testing for the various KPI's the weighted threshold result values (0 or 1 for each KPI variable A-E) are summed to render a normalized value between zero and 1. In the example provided in FIG. 6, the following formula/test is carried out by the logic 215 wherein a resulting value greater than 0.7 is deemed to pass.

$$0.3*A+0.3*B+0.2*C+0.1*D+0.1*E>0.7===\text{algorithm pass}$$

Thus, by specifying a weight of 0.3 for KPIs A and B, those KPI became essential for purposes of passing the improvement test applied during stage 520.

If the KPI improvement test fails during stage 520, control passes to stage 525 wherein the SON server 100 issues a message to the OSS 122 containing the previously configuration of the priority settings that are saved in the previous frequency layer priority settings 230. Additionally, the SON server 100 disables the conditional area (e.g. network load) that led to the failed attempt to improve performance by re-designating the priority settings in accordance with the absolute layer priority settings 340 associated with the conditional area. Control then passes to a decision timer wait stage 530 to carry out a delay specified in the decision timer 235 before restarting an execution loop of the radio frequency layer priority re-designation logic 215.

Continuing with the description of FIG. 5, in the event that the conditions for the emergency mode are not met, then control passes to stage 535 wherein the re-designation logic 215 analyzes trigger thresholds associated with a conditional area designated second highest in importance (e.g. "network load" in FIG. 4). If the trigger threshold is both enabled (see step 525 regarding disabling a conditional area temporarily in response to a failed re-designation) and met, then control passes to 540 wherein priority settings are specified to the OSS 122 corresponding to the second highest in importance conditional area. Control then passes to feedback stage 515 (previously described above).

Continuing with the description of FIG. 5, in the event that the conditions for the second most important conditional area are not met, then control passes from stage 535 to stage 545 wherein the re-designation logic 215 analyzes trigger thresholds associated with a conditional area designated third highest in importance (e.g. "mobility behavior" in FIG. 4). If the trigger threshold is both enabled (see step 525 regarding disabling a conditional area temporarily in response to a failed re-designation) and met, then control passes to 550 wherein priority settings are specified to the OSS 122 corresponding to the third highest in importance conditional area. Control then passes to feedback stage 515 (previously described above).

Continuing with the description of FIG. 5, in the event that the conditions for the third most important conditional area are not met, then control passes from stage 545 to stage 555 wherein the re-designation logic 215 analyzes trigger thresholds associated with a conditional area designated fourth highest in importance (e.g. "aggregation supported" in FIG. 4). If the trigger threshold is both enabled (see step 525 regarding disabling a conditional area temporarily in response to a failed re-designation) and met, then control passes to 560 wherein priority settings are specified to the OSS 122 corresponding to the fourth highest in importance conditional area. Control then passes to feedback stage 515 (previously described above).

Continuing with the description of FIG. 5, in the event that the conditions for the fourth most important conditional area are not met, then control passes from stage 555 to stage 565 wherein the re-designation logic 215 analyzes trigger thresholds associated with a conditional area designated fifth highest in importance (e.g. "3GPP new release support" in FIG. 4). If the trigger threshold is both enabled (see step 525 regarding disabling a conditional area temporarily in response to a failed re-designation) and met, then control passes to 570 wherein priority settings are specified to the OSS 122 corresponding to the fourth highest in importance conditional area. Control then passes to feedback stage 515 (previously described above). Otherwise control passes to wait stage 530 since, in the exemplary embodiment, no further conditional areas exist that would result in potential re-designation of the radio frequency layer priority settings for the cell.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, carried out by a programmed server, for managing radio frequency layer priority settings for radio access network nodes in a mobile wireless network supporting multiple radio frequency layers corresponding to particular radio frequency bands with each frequency band being sub-divided into multiple channels, the method comprising:
providing the programmed server with a radio frequency layer priority settings re-designation configuration for a ranked set of condition areas, the configuration including, for each one of the ranked set of conditional areas;
a set of radio frequency layer priority settings, and
a trigger definition for assigning the set of radio frequency layer priority settings to a radio access network node;
evaluating, by the programmed server, the trigger definition for at least one of the ranked set of conditional areas based upon current conditions;
issuing, by the programmed server based upon the current conditions meeting the trigger definition for at least one of the ranked set of conditional areas during the evaluating, a message to re-designate radio frequency layer priority settings for a radio access network node according to the set of radio frequency layer priority settings of a highest ranked conditional area for which the current conditions meet the trigger definition; and
receiving, by the programmed server after the issuing, network characteristics feedback.

2. The method of claim 1 further comprising:
determining, based upon the network characteristics feedback, whether the network characteristics improved after the issuing.

3. The method of claim 2 further comprising:
reverting, based upon the determining, back to previous radio frequency layer priority settings.

4. The method of claim 3 further comprising:
temporarily disabling, based upon the determining, applying current conditions bearing upon the conditional area to the trigger definition.

5. The method of claim 1 wherein the trigger definition comprises network conditions relating to network load.

6. The method of claim 1 wherein the trigger definition comprises network conditions relating to mobility behavior of user equipment units.

7. The method of claim 1 wherein the trigger definition comprises whether carrier layer aggregation is supported by a radio access network node to which the trigger definition applies.

8. The method of claim 1 wherein the trigger definition comprises whether a radio access network node layer, to which the trigger definition applies, supports user equipment applications requesting services associated with a particular standard version.

9. The method of claim 1 wherein the radio frequency layer priority settings are specified, by the programmed server, on a cell level of granularity.

10. The method of claim 1 wherein the radio access network node is an eNodeB cell.

11. A non-transitory computer-readable medium including computer-executable instructions for managing, by a programmed server, radio frequency layer priority settings for radio access network nodes in a mobile wireless network supporting multiple radio frequency layers corresponding to particular radio frequency bands with each frequency band being sub-divided into multiple channels, the computer-executable instructions, when executed on the programmed server, facilitating performing a method comprising:
providing the programmed server with a radio frequency layer priority settings re-designation configuration for a ranked set of conditional areas, the configuration including, for each one of the ranked set of conditional areas:
  a set of radio frequency layer priority settings, and
  a trigger definition for assigning the set of radio frequency layer priority settings to a radio access network node;
evaluating, by the programmed server, the trigger definition for at least one of the ranked set of conditional areas based upon current conditions;
issuing, by the programmed server based upon the current conditions meeting the trigger definition for at least one of the ranked set of conditional areas during the evaluating, a message to re-designate radio frequency layer priority settings for a radio access network node according to the set of radio frequency layer priority settings of a highest ranked conditional area for which the current conditions meet the trigger definition; and
receiving, by the programmed server after the issuing, network characteristics feedback.

12. The non-transitory computer-readable medium of claim 11, further comprising computer-executable instructions for:
  determining, based upon the network characteristics feedback, whether the network characteristics improved after the issuing.

13. The non-transitory computer-readable medium of claim 12 further comprising computer-executable instructions for:
  reverting, based upon the determining, back to previous radio frequency layer priority settings.

14. The non-transitory computer-readable medium of claim 13 further comprising computer-executable instructions for:
  temporarily disabling, based upon the determining, applying current conditions bearing upon the conditional area to the conditional area trigger definition.

15. A programmed server computer comprising:
  a processor; and
  a non-transitory computer-readable medium including computer-executable instructions for managing, by a programmed server, radio frequency layer priority settings for radio access network nodes in a mobile wireless network supporting multiple radio frequency layers corresponding to particular radio frequency bands with each frequency band being sub-divided into multiple channels, the computer-executable instructions, when executed on the programmed server, facilitating performing a method comprising:
  providing the programmed server with a radio frequency layer priority settings re-designation configuration for a ranked set of conditional areas, the configuration including, for each one of the ranked set of conditional areas:
    a set of radio frequency layer priority settings, and
    a trigger definition for assigning the set of radio frequency layer priority settings to a radio access network node;
  evaluating, by the programmed server, the trigger definition for at least one of the ranked set of conditional areas based upon current conditions;
  issuing, by the programmed server based upon the current conditions meeting the trigger definition for at least one of the ranked set of conditional areas during the evaluating, a message to re-designate radio frequency layer priority settings for a radio access network node according to the set of radio frequency layer priority settings of a highest ranked conditional area for which the current conditions meet the trigger definition; and
  receiving, by the programmed server after the issuing, network characteristics feedback.

16. The programmed server of claim 15 wherein the non-transitory computer-readable medium further comprises computer-executable instructions for:
  determining, based upon the network characteristics feedback, whether the network characteristics improved after the issuing.

17. The programmed server of claim 16 wherein the non-transitory computer-readable further comprises computer-executable instructions for:
  reverting, based upon the determining, back to previous radio frequency layer priority settings.

* * * * *